United States Patent [19]

Hiramatsu

[11] Patent Number: 5,841,400

[45] Date of Patent: Nov. 24, 1998

[54] ESTIMATOR OF DIRECTION OF DESIRED SIGNAL

[75] Inventor: Katsuhiko Hiramatsu, Yokohama, Japan

[73] Assignee: Matsushita Electric Industrial Co., Ltd., Kadoma, Japan

[21] Appl. No.: 946,433

[22] Filed: Oct. 7, 1997

[30] Foreign Application Priority Data

Oct. 20, 1996 [JP] Japan ................................. 8-297573
Jan. 24, 1997 [JP] Japan ................................. 9-024541

[51] Int. Cl.$^6$ .............................. G01S 3/16; G01S 3/28
[52] U.S. Cl. .......................................... 342/382; 342/152
[58] Field of Search ................................. 342/382, 152

[56] References Cited

U.S. PATENT DOCUMENTS 4,532,515  7/1985  Cantrell et al. .......................... 342/424
5,585,803  12/1996  Miura et al. ............................ 342/372

OTHER PUBLICATIONS

H. Tsuji et al., "Estimation of Direction of Desired Signals Using Cyclostationarity", Technical Report of IEICE, RCS96–77, pp. 77–82, Aug. 1996.

J. Xin et al., "Regularization Approach for Direction of Cyclostationary Signals in Antenna Array Processing", Technical Report of IEICE, RC96–76, pp. 69–76, Aug., 1996.

*Primary Examiner*—Theodore M. Blum
*Attorney, Agent, or Firm*—Spencer & Frank

[57] ABSTRACT

A desired signal is received at first and second antennas. Output signals of the first and second antennas are orthogonal-detected by first and second signal conversion circuits and thereby converted into first and second baseband signals. A complex conjugation circuit generates a complex conjugation signal by calculating a complex conjugation of the second baseband signal. The first baseband signal and the complex conjugation signal are multiplied by a multiplier. A direction estimation circuit estimates a direction of the desired signal by effecting an inverse tangent calculation and an inverse cosine calculation on an output signal of the multiplier.

16 Claims, 10 Drawing Sheets

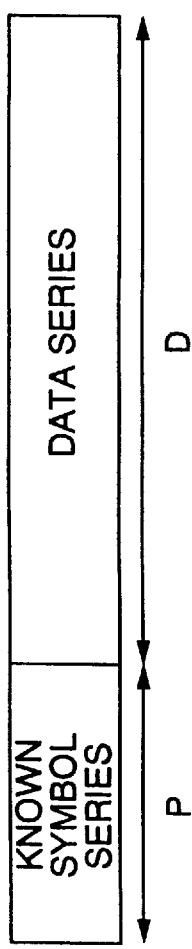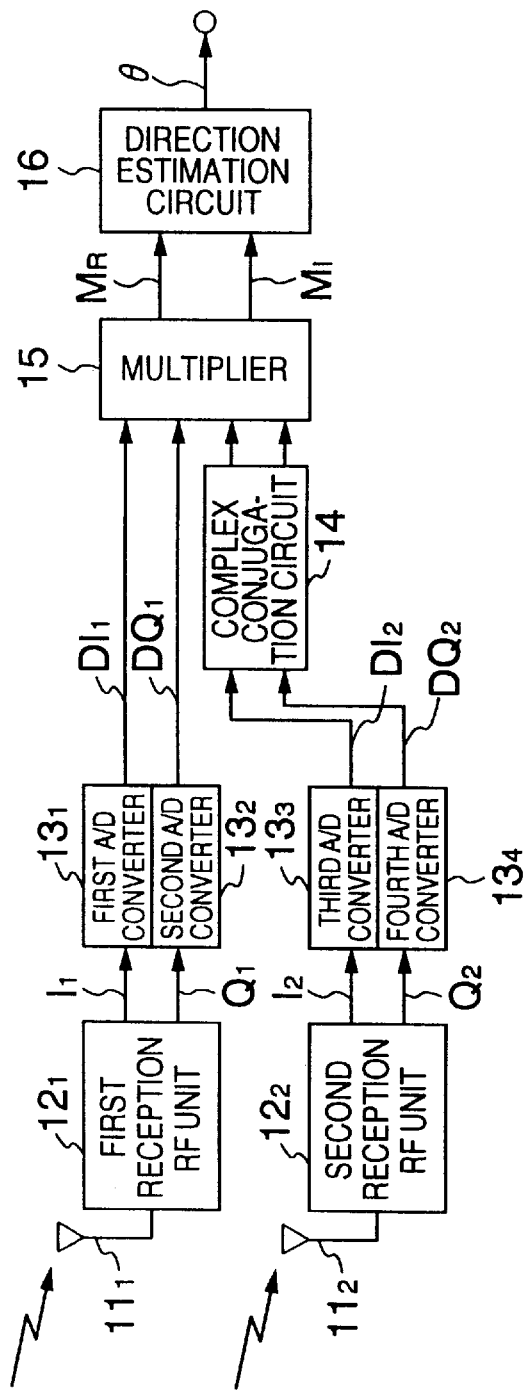

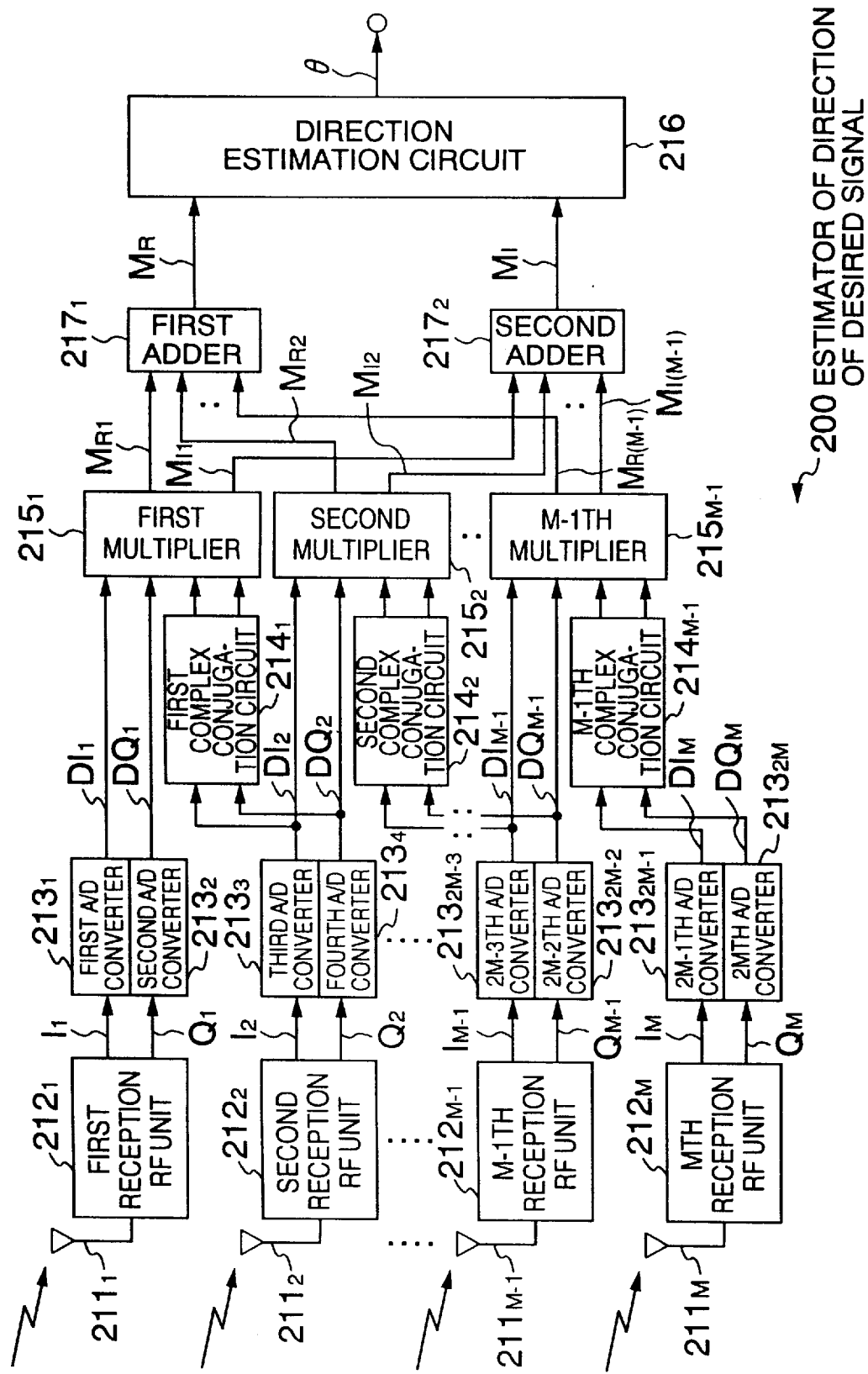

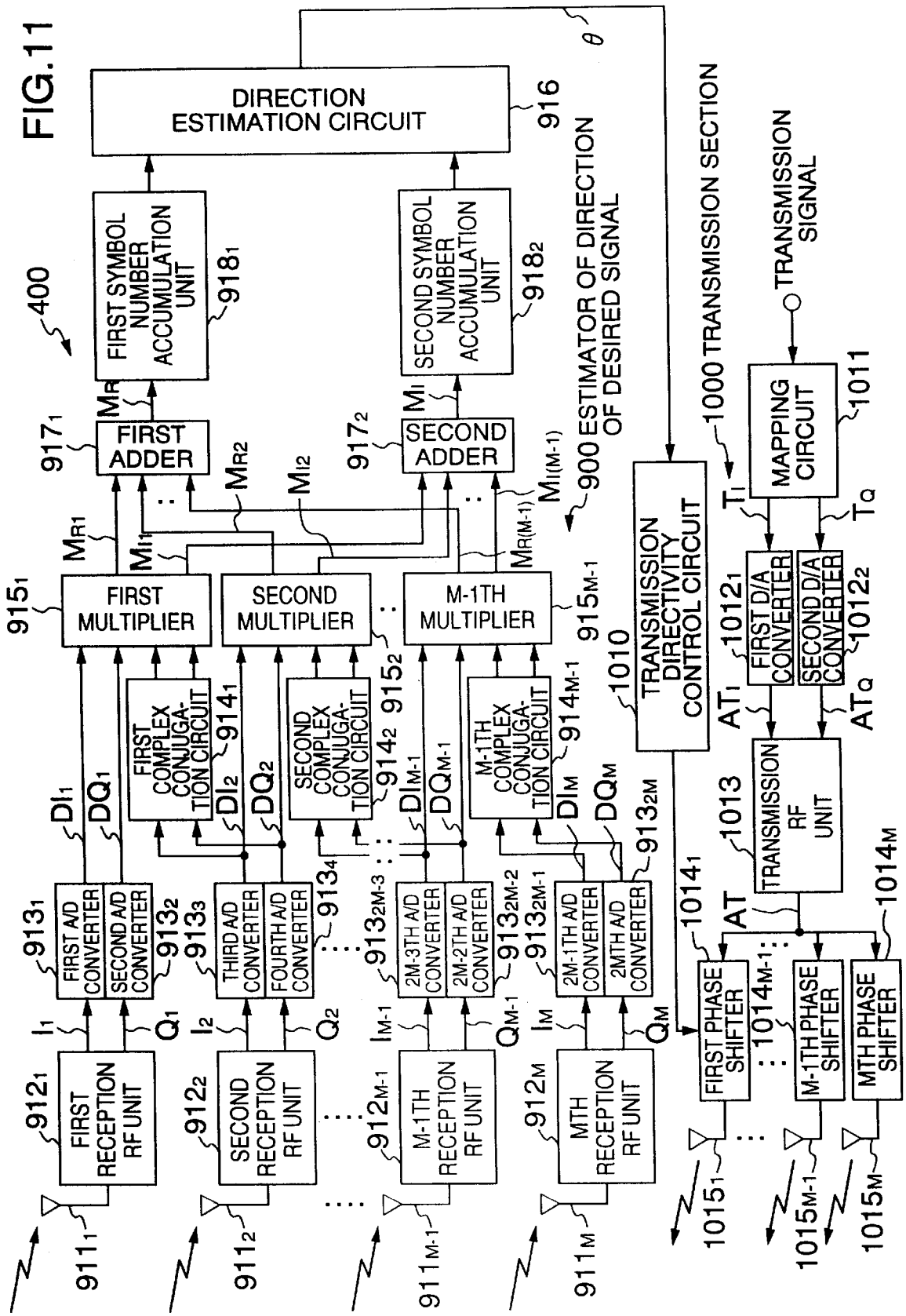

ESTIMATOR OF DIRECTION OF DESIRED SIGNAL

BACKGROUND OF THE INVENTION

1. Field of the Invention

The present invention relates to an estimator of direction of desired signal for estimating direction of desired signal, and particularly to an estimator of direction of desired signal for estimating direction of desired signal without calculation of a large calculation amount, such as computation of a mutual correlation coefficient between antennas or inverse matrix calculation.

2. Description of the Related Art

Heretofore, there are known estimators of direction of desired signal which make effective use of cyclostationarity of signal (e.g. H. Tsuji et al, "Estimation of Direction of Desired Signals using Cyclostationarity", Technical Report of IEICE, RCS96-77, pp. 77–82, August 1996 and J. Xin et al, "Regularization Approach for Detection of Cyclostationary Signals in Antenna Array Processing", Technical Report of IEICE, RCS96-76, pp. 69–76, August 1996). Roughly speaking, such estimator of direction of desired signal is able to estimate direction of desired signal by using a received signal of each array antenna as follows:

If a source signal is expressed as s(t) and a direction of the source signal s(t) is expressed as θ, then a signal $x_i(t)$ received at a time t by an ith antenna of m array antennas arranged linearly with an equal interval is expressed by the following equation:

$$x_i(t) = s(t) \cdot \exp\{j\pi(i-1) \cdot \sin\theta\} \quad (1\text{-}1)$$

where i=1, 2, . . . , m.

If a desired signal has a specific cyclic frequency α, x(·) is a cyclostationary process and a cyclic correlation function is expressed as $R_x^\alpha(\tau)$, then a cyclic correlation function of y(t)=x(t+T) is expressed as $R_y^\alpha(\tau) = R_x^\alpha(\tau) \cdot \exp(j2\pi\alpha T)$ where τ is the lag constant. If a cyclic auto-correlation function (CACF) of each antenna output is calculated by using this property, then such cyclic auto-correlation function is expressed by the following equation:

$$R_{m-1}^\alpha(\tau) = \frac{1}{L} e^{-j\pi\alpha\tau} \sum_{m=0}^{L-1} x_{m-1}(n+\tau) x_m(n) e^{-j2\pi\alpha n} \quad (1\text{-}2)$$

where n=0, 1, . . . , L−1 and m=0, 1, . . . , m−1.

If an antenna output $x_m(n)$ can be predicted by other m−1 antenna outputs, then the antenna output $x_m(n)$ is expressed by the following equation:

$$x_m(n) = \sum_{i=1}^{n-1} x_{m-1}(n) a_i^c \quad (1\text{-}3)$$

where $a_i^c$ is the prediction coefficient.

Having summarized the above-mentioned equations in the form of matrix, then we have:

$$y_c = \Phi a_c \quad (1\text{-}4)$$

$$\begin{vmatrix} R_m^\alpha(-L_0+1) \\ \cdot \\ \cdot \\ \cdot \\ R_m^\alpha(0) \\ \cdot \\ \cdot \\ \cdot \\ R_m^\alpha(L_0-1) \end{vmatrix} = \begin{vmatrix} R_{m-1}^\alpha(-L_0+1), & \ldots, & R_1^\alpha(-L_0+1) \\ \cdot & & \cdot \\ \cdot & & \cdot \\ \cdot & & \cdot \\ R_{m-1}^\alpha(0), & \ldots, & R_1^\alpha(L_0-1) \\ \cdot & & \cdot \\ \cdot & & \cdot \\ \cdot & & \cdot \\ R_{m-1}^\alpha(L_0-1), & \ldots, & R_1^\alpha(L_0-1) \end{vmatrix} \begin{vmatrix} a_1^c \\ a_2^c \\ \cdot \\ \cdot \\ \cdot \\ a_{m-2}^c \\ a_{m-1}^c \end{vmatrix} \quad (1\text{-}5)$$

When the linear system is expressed by the equation (1-4), it is customary that the prediction coefficient is calculated so as to minimize mean square error. If $N=2L_0-1$, a linear prediction coefficient vector obtained from a standpoint of minimizing a square prediction error is expressed by the following equation:

$$\hat{a}_c = \left[ \frac{1}{N} \phi^H \phi \right]^{-1} \left( \frac{1}{N} \phi^H y_c \right) \quad (1\text{-}6)$$

Thus, when we calculate the prediction coefficient from the above-mentioned equation (1-6), it is possible to estimate direction of desired signal by calculating an angle θ at which a value of P(θ) expressed by the following equation becomes maximum where $z = \exp(j\pi \cdot \sin\theta)$:

$$P(\theta) = \frac{1}{|1 - a_i Z^{-1} - \ldots - a_{m-1} Z^{-(m-1)}|^2} \quad (1\text{-}7)$$

However, since the above-mentioned estimator of direction of desired signal requires the calculation of the mutual correlation coefficient between the antenna outputs and the inverse matrix calculation, it cannot be avoided that a calculation amount increases.

SUMMARY OF THE INVENTION

It is an object of the present invention to provide an estimator of direction of desired signal which can estimate direction of desired signal by a small calculation amount.

In order to attain the above-mentioned object, since a known symbol series P is located in front of a data series D in an ordinary communication as shown in FIG. 1, the estimator of direction of desired signal according to the present invention estimates direction of desired signal by executing a calculation of a small calculation amount similar to a calculation of a delayed detection instead of a calculation of a large calculation amount such as a computation of a mutual correlation coefficient between antenna outputs or an inverse matrix calculation.

According to the present invention, there is provided a first estimator of direction of desired signal which includes:
first and second antennas for receiving a desired signal;
first and second signal conversion circuits for orthogonal-detecting output signals of the first and second antennas and converting the detected output signals into first and second baseband signals, respectively;
a complex conjugation circuit for generating a complex conjugation signal by calculating a complex conjugation of the second baseband signal;
a multiplier for multiplying the first baseband signal and the complex conjugation signal; and
a direction estimation circuit for estimating the direction of the desired signal by effecting an inverse tangent calculation and an inverse cosine calculation on an output signal from the multiplier.

According to the present invention, there is provided a second estimator of direction of desired signal which includes:

first to third antennas for receiving desired signals;

first to third signal conversion circuits for orthogonal-detecting output signals of the first to third antennas and converting the detected output signals into first to third baseband signals, respectively;

first and second complex conjugation circuits for generating first and second complex conjugation signals by calculating complex conjugations of the second and third baseband signals, respectively;

a first multiplier for multiplying the first baseband signal and the first complex conjugation signal;

a second multiplier for multiplying the second baseband signal and the second complex conjugation signal;

an adder for adding an output signal of the first multiplier and an output signal of the second multiplier; and a direction estimation circuit for estimating a direction of the desired signal by effecting an inverse tangent calculation and an inverse cosine calculation on an output signal from the adder.

According to the present invention, there is provided a third estimator of direction of desired signal for estimating a direction of a desired signal having a plurality of known symbols each having an equal power which includes:

first and second antennas for receiving the desired signal;

first sand second signal conversion circuits for orthogonal-detecting output signals of the first and second antennas and converting the detected output signals into first and second baseband signals, respectively;

a complex conjugation circuit for generating a complex conjugation signal by calculating a complex conjugation of the second baseband signal corresponding to the known symbol;

a multiplier for multiplying the first baseband signal corresponding to the known symbol and the complex conjugation signal;

a symbol number accumulation unit for accumulating an output signal of the multiplier with respect to at least more than two known symbols; and a direction estimation circuit for estimating a direction of the desired signal by effecting an inverse tangent calculation and an inverse cosine calculation on an output signal of the symbol number accumulation unit.

According to the present invention, there is provided a fourth estimator of direction of desired signal for estimating a direction of a desired signal having a plurality of known symbols each having an equal power which includes:

first to third antennas for receiving the desired signal;

first to third signal conversion circuits for orthogonal-detecting output signals of the first to third antennas and converting the detected output signals into first to third baseband signals, respectively;

first and second complex conjugation circuits for generating first and second complex conjugation signals by calculating complex conjugations of the second and third baseband signals corresponding to the known symbols, respectively;

a first multiplier for multiplying the first baseband signal corresponding to the known symbol and the first complex conjugation signal;

a second multiplier for multiplying the second baseband signal corresponding to the known symbol and the second complex conjugation signal;

an adder for adding an output signal of the first multiplier and an output signal of the second multiplier;

a symbol number accumulation unit for accumulating an output signal of the adder with respect to at least more than two known symbols; and a direction estimation circuit for estimating a direction of the desired signal by effecting an inverse tangent calculation and an inverse cosine calculation on an output signal of the symbol number accumulation unit.

According to the present invention, there is provided a fifth estimator of direction of desired signal for estimating a direction of a desired signal used in a communication according to a code division multiplex access system which includes:

first to third antennas for receiving the desired signal;

first to third signal conversion circuits for orthogonal-detecting output signals of the first to third antennas and converting the detected output signals into first to third baseband signals, respectively;

first to third despread circuits for despreading the first to third baseband signals, respectively;

first and second complex conjugation circuits for generating first and second complex conjugation signals by calculating complex conjugations of the despread second and third baseband signals, respectively;

a first multiplier for multiplying the despread first baseband signal and the first complex conjugation signal;

a second multiplier for multiplying the despread second baseband signal and the second complex conjugation signal;

an adder for adding an output signal of the first multiplier and an output signal of the second multiplier; and a direction estimation circuit for estimating a direction of the desired signal by effecting an inverse tangent calculation and an inverse cosine calculation on an output signal of the adder.

According to the present invention, there is provided a sixth estimator of direction of desired signal for estimating a direction of a desired signal having a plurality of known symbols and a plurality of data used in a communication according to a modulation system in which an envelope of a transmission symbol becomes constant which includes:

first to third antennas for receiving the desired signal;

first to third signal conversion circuits for orthogonal-detecting output signals of the first to third antennas and converting the detected output signals into first to third baseband signals, respectively;

first and second complex conjugation circuits for generating first and second complex conjugation signals by calculating complex conjugations of the second and third baseband signals corresponding to the known symbol and data, respectively;

a first multiplier for multiplying the first baseband signal corresponding to the known symbol and data and the first complex conjugation signal;

a second multiplier for multiplying the second baseband signal corresponding to the known symbol and data and the second complex conjugation signal;

an adder for adding an output signal of the first multiplier and an output signal of the second multiplier;

a symbol number accumulation unit for accumulating an output signal of the adder with respect to at least more than the two known symbols and at least more than two data; and a direction estimation circuit for estimating a direction of the desired signal by effecting an inverse tangent calculation and an inverse cosine calculation on an output signal of the symbol number accumulation unit.

According to the present invention, there is provided a seventh estimator of direction of desired signal for estimating a direction of a desired signal containing a plurality of known symbols and a plurality of data used in a communication according to a modulation system in which an envelope of a transmission signal becomes constant which includes:

first to third antennas for receiving the desired signal;

first to third signal converting circuits for orthogonal-detecting output signals of the first to third antennas and converting the detected output signals into first to third baseband signals, respectively;

first and second complex conjugation circuits for generating first and second complex conjugation signals by calculating complex conjugations of the second and third baseband signals corresponding to the known symbol and data, respectively;

a first multiplier for multiplying the first baseband signal corresponding to the known symbol and data and the first complex conjugation signal;

a second multiplier for multiplying the second baseband signal corresponding to the known symbol and data and the second complex conjugation signal;

an adder for adding an output signal of the first multiplier and an output signal of the second multiplier;

a symbol number accumulation unit for accumulating an output signal of the adder with respect to at least more than the two known symbols and at least more than the two data;

a slot averaging circuit for averaging an output signal of the symbol number accumulation unit over at least more than two slots; and a direction estimation circuit for estimating a direction of the desired signal by effecting an inverse tangent calculation and an inverse cosine calculation on an output signal of the slot averaging circuit.

According to the present invention, there is provided an eighth estimator of direction of desired signal which is the seventh estimator of direction of desired signal and which further includes:

a power computation circuit for computing a power of a direction vector of one slot from the output signal of the symbol number accumulation unit; and a comparison circuit for comparing an output signal of the power computation circuit with a predetermined threshold value and inputting the output signal of the symbol number accumulation unit into the slot averaging circuit when the output signal of the power computation circuit is larger than the predetermined threshold value.

According to the present invention, there is provided a transmission and reception apparatus for controlling a transmission direction of a transmission signal by using a direction of a desired signal which includes:

any one of first to eighth estimator of direction of desired signal;

a phase shifter for phase-controlling the transmission signal;

a transmission directivity control circuit for determining a phase of the transmission signal by controlling the phase shifter on the basis of the direction of the desired signal estimated by the estimator of direction of desired signal; and a transmission antenna into which an output signal of said phase shifter is inputted.

BRIEF DESCRIPTION OF THE DRAWINGS

FIG. 1 is a diagram showing a known symbol series in an ordinary communication;

FIG. 2 is a block diagram showing an estimator of direction of desired signal according to a first embodiment of the present invention;

FIG. 3 is a block diagram showing an estimator of direction of desired signal according to a second embodiment of the present invention;

FIG. 11 is a block diagram showing an embodiment of a transmission and reception apparatus having a direction estimating section having a configuration similar to that of the estimator of direction of desired signal shown in FIG. 5.

Figure 4:
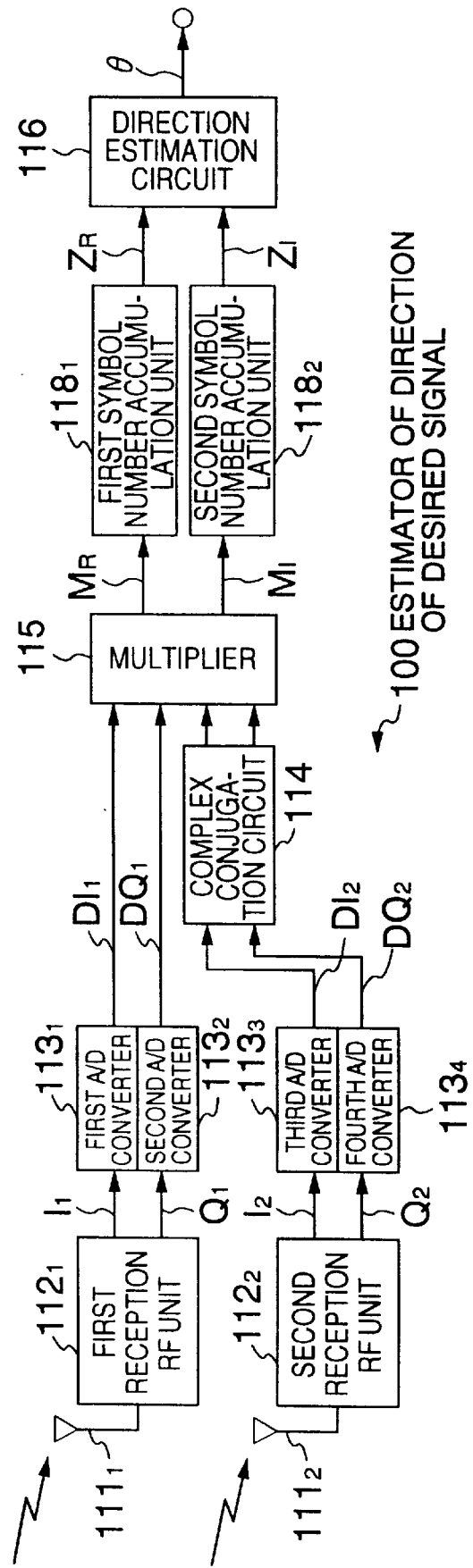
FIG. 4 is a block diagram showing an estimator of direction of desired signal according to a third embodiment of the present invention.

DESCRIPTION OF THE PREFERRED EMBODIMENTS (First embodiment)

As shown in FIG. 2, an estimator of direction of desired signal 10 according to the first embodiment of the present invention comprises first and second antennas $11_1$, $11_2$, first and second reception RF units $12_1$, $12_2$, first to fourth analog-to-digital converters (A/D converters) $13_1$ to $13_4$, a complex conjugation circuit 14, a multiplier 15 and a direction estimation circuit 16.

Having down-converted a frequency of a first high-frequency reception signal outputted from the first antenna $11_1$, the first reception RF unit $12_1$ orthogonal-detects the down-converted first high-frequency reception signal, thereby converting the first high-frequency reception signal into a first baseband signal (a first inphase component signal $I_1$ and a first quadrature component signal $Q_1$). Having down-converted a frequency of a second high-frequency reception signal outputted from the second antenna $11_2$, the second reception RF unit $12_2$ orthogonal-detects the down-converted second high-frequency reception signal, thereby converting the second high-frequency reception signal into second baseband signals (a second inphase signal $I_2$ and a second quadrature component signal $Q_2$). The first and second A/D converters $13_1$, $13_2$ are adapted to convert the analog first inphase component signal $I_1$ and the analog first quadrature component signal $Q_1$ outputted from the first reception RF unit $12_1$ into a first digital inphase component signal $DI_1$ and a first digital quadrature component signal $DQ_1$, respectively. The third and fourth A/D converters $13_3$, $13_4$ are adapted to convert the analog second inphase component signal $I_2$ and the analog second quadrature component signal $Q_2$ outputted from the second reception RF unit $12_2$ into a second digital inphase component signal $DI_2$ and a second digital quadrature component signal $DQ_2$, respectively. The complex conjugation circuit 14 is adapted to calculate a complex conjugation of the second digital inphase component signal $DI_2$ and the second digital quadrature component signal $DQ_2$ by inverting the code of the second digital quadrature component signal $DQ_2$ outputted from the fourth A/D converter $13_4$, and generates a complex conjugation signal.

The multiplier 15 is adapted to multiply in vector the first digital inphase component signal $DI_1$ and the second digital quadrature component signal $DQ_1$ outputted from the first and second A/D converters $13_1$, $13_2$ with the complex conjugation signal outputted from the complex conjugation circuit 14. Specifically, if the first digital baseband signal expressed by the first digital inphase component signal $DI_1$ and the first digital quadrature component signal $DQ_1$ is taken as $a_1(n)$ and the complex conjugation signal of the second digital baseband signal expressed by the second digital inphase component signal $DI_2$ and the second digital quadrature component signal $DQ_2$ is taken as $a_2{}^*(n)$, then a multiplied result M of the multiplier 15 is expressed by the following equation:

$$M = a_1(n) \times a_2{}^*(n) \tag{2-1}$$

Incidentally, the calculation on the equation (2-1) is similar to a multiplication (see the next equation) of a digital baseband signal $a(n)$ obtained from a signal received at one antenna and a complex conjugation signal $a^*(n-1)$ of a signal which results from delaying this digital baseband signal $a(n)$ by one symbol.

$$a(n) \times a^*(n-1) \tag{2-2}$$

The multiplier 15 is adapted to output a real part signal $M_R$ indicative of a real part of the multiplied result M expressed by the above-mentioned equation (2-1) and an imaginary part signal $M_I$ indicative of an imaginary part of the multiplied result M. The direction estimation circuit 16 is adapted to estimate the direction of the desired signal in the following procedure by using the real part signal $M_R$ and imaginary part signal $M_I$ outputted from the multiplier 15.

In general, if there are located a plurality of antennas with an interval of $\lambda/2$ ($\lambda$ is a wavelength of the desired signal), a known symbol at a time t is taken as $x^0(t)$ and an angle in the clockwise direction from the broadside direction is taken as $\theta$, then a baseband signal $x_i(t)$ of a reception signal outputted from an ith antenna (ith antenna element of array antenna) is expressed by the following equation:

$$x_i(t) = x^0(t) \cdot \exp(j\pi i \cdot \cos\theta) \tag{2-3}$$

If the calculation of the equation (2-1) is carried out with respect to this baseband signal $x_i(t)$ and a baseband signal of a reception signal outputted from the adjacent antenna, then a calculated result $y_i(n)$ becomes a function of an angle $\theta$ as expressed by the following equation:

$$\begin{aligned} y_i(n) &= x_{i+1}(n) \times x_i{}^*(n) \\ &= \{x^0(n) \cdot e^{j\pi(i+1)\cdot\cos\theta}\}\{(x^0(n))^* \cdot e^{-j\pi i \cdot \cos\theta}\} \\ &= x^0(n) \cdot (x^0(n))^* \cdot e^{-j\pi \cdot \cos\theta} \end{aligned} \tag{2-4}$$

Solving the above-mentioned equation (2-4) with respect to the angle $\theta$, the angle $\theta$ is expressed by the following equation:

$$\theta = \cos^{-1}\left(\frac{1}{\pi} \tan^{-1}\left(\frac{Im(y_1(n))}{Re(y_1(n))}\right)\right) \tag{2-5}$$

where $Im(\cdot)$ represents a calculation for producing an imaginary part and $Re(\cdot)$ represents a calculation for producing a real part. Accordingly, by carrying out an inverse tangent calculation and an inverse cosine calculation with respect to the right-hand side of the above-mentioned equation (2-5), it is possible to calculate an instantaneous value $\theta$ of the direction of the desired signal.

When there are provided two antennas as shown in FIG. 2, if i=0, then it is possible to calculate the instantaneous value $\theta$ of the direction of the desired signal from the equation (2-5). Incidentally, a plurality of antennas need not be always disposed at the interval of $\lambda/2$. So long as a plurality of antennas are close to each other, they may be located at some suitable intervals such as $\lambda/4$. In general, if a plurality of antennas are located at an interval of $\lambda/n$, then the following equation may be used instead of the above-mentioned equation (2-3):

$$x_i(t) = x^0(t) \cdot \exp(j2\pi i/n \cdot \cos\theta) \tag{2-6}$$

(Second embodiment)

As in the estimator of direction of desired signal 10 according to the first embodiment of the present invention, if the complex conjugation of the baseband signal of the output signal of one antenna and the baseband signal of the output signal of the other antenna are multiplied with each other between outputs of adjacent antennas, then the multiplied result does not become a function of antenna number i as expressed by the above-mentioned equation (2-4). Therefore, an added value z expressed by an equation (3-1), in which the multiplied results with respect to the adjacent antennas as shown in the equation (2-4) are added, is calculated by using a plurality of antennas, then it is possible to calculate the direction of the desired signal based on an equation (3-2):

$$z = \frac{1}{M-2} \sum_{i=0}^{M-2} y_1(n) \tag{3-1}$$

$$\theta = \cos^{-1}\left(\frac{1}{\pi} \tan^{-1}\left(\frac{Im(z)}{Re(z)}\right)\right) \tag{3-2}$$

Although a signal power increases in response to the number of antennas when the direction of the desired signal is calculated with the increase of the number of antennas, Gaussian noises do not increase even if they are added, and hence it is possible to improve an S/N (signal-to-noise ratio).

As shown in FIG. 3, an estimator of direction of desired signal 200 according to a second embodiment of the present invention comprises first to Mth antennas $211_1$ to $211_M$, first to Mth reception RF units $212_1$ to $212_M$, first to 2Mth analog-to-digital converters (A/D converters) $213_1$ to $213_{2M}$, first to M-1th complex conjugation circuits $214_1$ to $214_{M-1}$, first to M-1th multipliers $215_1$ to $215_{M-1}$, first and second adders $217_1$, $217_2$ and a direction estimation circuit 216.

Having down-converted frequencies of high-frequency reception signals outputted from the first to Mth antennas $211_1$ to $211_M$, the first to Mth reception RF units $212_1$, to $212_M$ orthogonal-detect the down-converted high-frequency reception signals and convert the high-frequency reception signals into first to Mth inphase component signals $I_1$ to $I_M$ and first to Mth quadrature component signals $Q_1$ to $Q_M$ of the baseband band, respectively.

The first to 2Mth A/D converters $213_1$ to $213_{2M}$ are adapted to convert the analog first to Mth inphase component signals $I_1$ to $I_M$ and the analog first to Mth quadrature component signals $Q_1$ to $Q_M$ into first to Mth digital inphase component signals $DI_1$ to $DI_M$ and first to Mth digital quadrature component signals $DQ_1$ to $DQ_M$, respectively. For example, the first and second A/D converters $213_1$, $213_2$ are adapted to convert the analog first inphase component signal $I_1$ and the analog first quadrature component signal $Q_1$ outputted from the first reception unit $212_1$ into the first digital inphase component signal $DI_1$ and the first digital quadrature component signal $DQ_1$, respectively.

The ith (i=1 to M−1) complex conjugation circuit $214_i$ calculates a complex conjugation of an i+1th digital inphase component signal $DI_{i+1}$ and an i+1th digital quadrature component signal $DQ_{i+1}$ by inverting a code of the i+1th digital quadrature component signal $DQ_{i+1}$ outputted from a $2(i+1)$th A/D converter $213_{2(i+1)}$, and then generates an ith complex conjugation signal. For example, the first complex conjugation circuit $214_1$ calculates a complex conjugation of the second digital inphase component signal $DI_2$ and the second digital quadrature component signal $DQ_2$ by inverting a code of the second digital quadrature component signal $DQ_2$ outputted from the fourth A/D converter $213_4$, and then generates a first complex conjugation signal.

An ith multiplier $215_i$ (i=1 to M−1) is adapted to multiply in vector the ith digital inphase component signal $DI_i$ and an ith digital quadrature component signal $DQ_i$ outputted from the 2i−1th and 2ith A/D converters $213_{2i-1}$, $213_{2i}$ and the ith complex conjugation signal outputted from the ith complex conjugation circuit $214_i$ (see the above-mentioned equation (2-1)). For example, the first multiplier $215_1$ multiplies in vector the first digital inphase component signal $DI_1$ and the first digital quadrature component signal $DQ_1$ outputted from the first and second A/D converters $213_1$, $213_2$ and the first complex conjugation signal outputted from the first complex conjugation circuit $214_1$. Incidentally, the first to M−1th multipliers $215_1$ to $215_{M-1}$ output first to M−1th real part signals $M_{R1}$ to $M_{R(M-1)}$ and first to M−1th imaginary part signals $M_{I1}$ to $M_{I(M-1)}$ of multiplied results $M_1$ to $M_{M-1}$ in the first to Mth multipliers $215_1$ to $215_{M-1}$, respectively.

The first adder $217_1$ is adapted to output a real part added signal $M_R$ by adding the first to Mth real part signals $M_{R1}$ to $M_{R(M-1)}$ outputted from the first to M−1th multipliers $215_1$ to $215_{M-1}$. The second adder $217_2$ is adapted to output an imaginary part added signal $M_I$ by adding the first to M−1th imaginary part signals $M_{I1}$ to $M_{I(M-1)}$ outputted from the first to M−1th multipliers $215_1$ to $215_{M-1}$.

The direction estimation circuit 216 is adapted to estimate the direction of the desired signal by using the real part added signal $M_R$ outputted from the first adder $217_1$ and the imaginary part added signal $M_I$ outputted from the second adder $217_2$ on the basis of the above-mentioned equation (3-2).

(Third embodiment)

While the estimators 10, 200 according to the first and second embodiments estimate the direction of the desired signal by using one symbol of the known symbol series P (see FIG. 1) as described above, an estimation accuracy can be improved if there are used a plurality of symbols. Specifically, as earlier noted in the estimator 10 according to the first embodiment, if the complex conjugation signal of the baseband signal of the output signal of one antenna and the baseband signal of the output signal of the other antenna are multiplied between the adjacent antennas, then the multiplied result does not become the function of the antenna number i as expressed by the above-mentioned equation (2-4) but becomes a function of a power of a reception symbol and a direction. Accordingly, since the power of the equation (2-4) becomes equal during a different symbol time by using the known symbol series P in which the power of the reception symbol is equal, if the added value z shown in the equation (4-1) in which results respectively obtained with respect to N symbols are added is obtained, then it is possible to calculate the direction of the desired signal based on the equation (4-2):

$$z = \sum_{n=0}^{N-1} \{y_1(n)\} \quad (4\text{-}1)$$

$$\theta = \cos^{-1}\left(\frac{1}{\pi} \tan^{-1}\left(\frac{Im(z)}{Re(z)}\right)\right) \quad (4\text{-}2)$$

Although the signal power increases in response to the number of additions when the direction of the desired signal is calculated while the number of symbols is increased as described above, the power of Gaussian noises does not change even if they are added. Thus, it is possible to improve an S/N.

An estimator of direction of desired signal 100 according to the third embodiment of the present invention is the above-mentioned estimator and is different from the estimator 10 of the first embodiment shown in FIG. 2 in that first and second symbol number accumulation units $118_1$, $118_2$ are disposed between the multiplier 115 and the direction estimation circuit 116 as shown in FIG. 4. Accordingly, since the first and second antennas $111_1$, $111_2$, the first and second reception RF units $112_1$, $112_2$, the first to fourth analog-to-digital converters (A/D converters) $113_1$ to $113_4$, the complex conjugation circuit 114 and the multiplier 115 have the same functions as those of the first and second antennas $11_1$, $11_2$, the first and second reception RF units $12_1$, $12_2$, the first to fourth analog-to-digital converters (A/D converters) $13_1$ to $13_4$, the complex conjugation circuit 14 and the multiplier 15 shown in FIG. 2, they need not be described herein but the first and second symbol number accumulation units $118_1$, $118_2$ and the direction estimation circuit 116 will be described hereinafter.

The first symbol number accumulation unit $118_1$ is adapted to accumulate the real part signal $M_R$ outputted from the multiplier 115 by an amount of a predetermined symbol number N. The second symbol number accumulation unit $118_2$ is adapted to accumulate the imaginary part signal $M_I$ outputted from the multiplier 115 by the amount of the predetermined symbol number N. The direction estimation circuit 116 is adapted to estimate the direction $\theta$ of the desired signal based on the above-mentioned equations (4-1) and (4-2) by using an accumulated result $Z_R$ of the real part signal $M_R$ of the predetermined symbol number N and an accumulated result $Z_I$ of the imaginary part signal $M_I$ of the predetermined symbol number N outputted from the first and second symbol number accumulation units $118_1$, $118_2$.

(Fourth embodiment)

An estimator of direction of desired signal 300 according to the fourth embodiment of the present invention is a combination of the estimator 200 according to the second embodiment and the estimator 100 according to the third embodiment, and is able to improve an S/N by calculating the direction of the desired signal while the number of antennas and the number of symbols are increased. Incidentally, if the number of antennas is taken as M and the number of symbols is taken as N, then the added value z of powers and the direction θ of the desired signal are expressed by the following equations:

$$z = \sum_{n=0}^{N-1} \left\{ \frac{1}{M-2} \sum_{i=0}^{M-2} y_1(n) \right\} \tag{5-1}$$

$$\theta = \cos^{-1}\left( \frac{1}{\pi} \tan^{-1}\left( \frac{Im(z)}{Re(z)} \right) \right) \tag{5-2}$$

Figure 5:
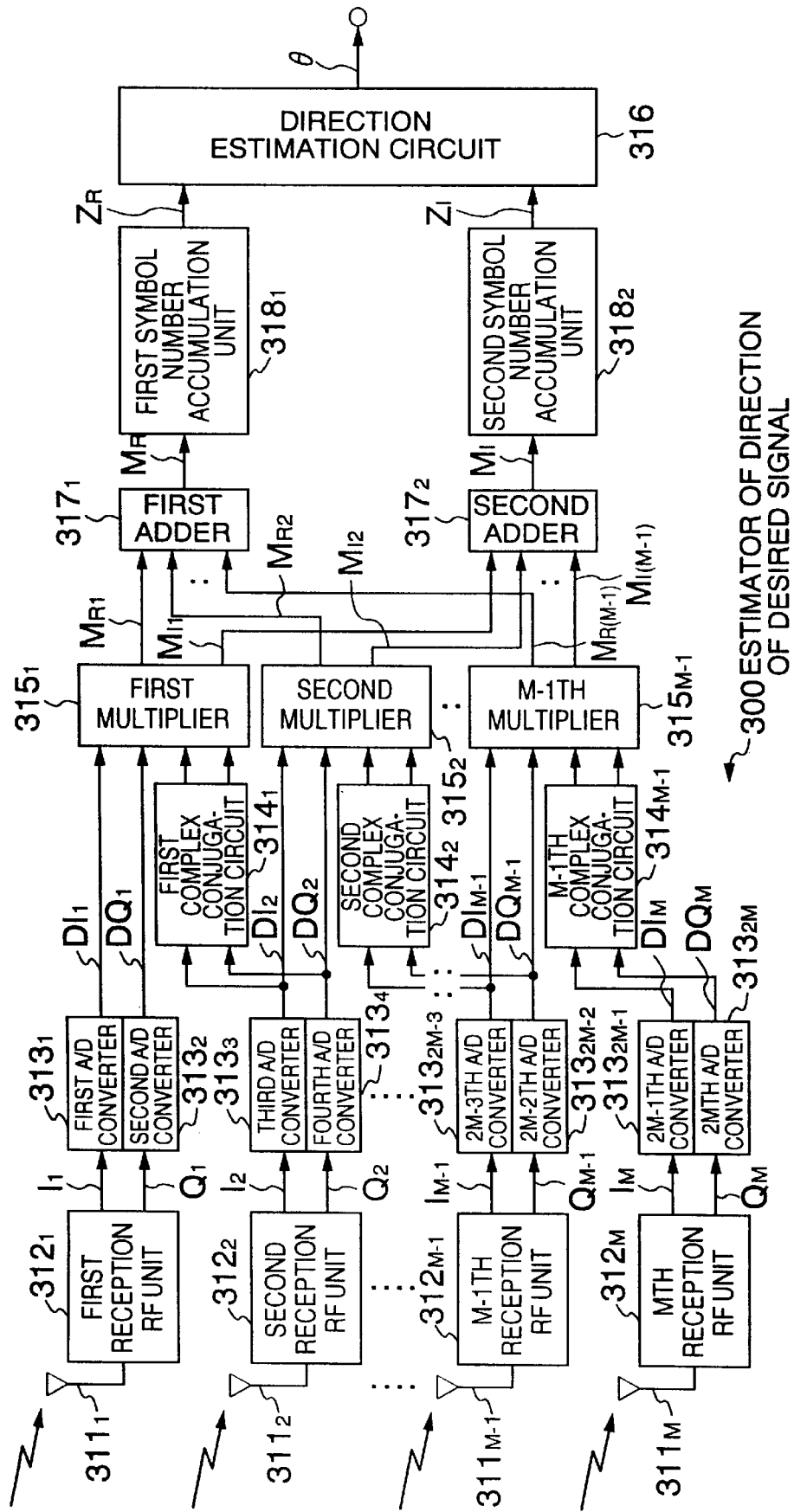
FIG. 5 is a block diagram showing an estimator of direction of desired signal according to a fourth embodiment of the present invention.

As shown in FIG. 5, the estimator 300 according to this embodiment is different from the estimator 200 according to the second embodiment shown in FIG. 3 in that a first symbol number accumulation unit $318_1$ is disposed between a first adder $317_1$ and a direction estimation circuit 316 and a second symbol number accumulation unit $318_2$ is disposed between a second adder $317_2$ and the direction estimation circuit 316. Accordingly, since first to Mth antennas $311_1$ to $311_M$, first to Mth reception RF units $312_1$ to $312_M$, first to 2Mth analog-to-digital converters (A/D converters) $313_1$ to $313_{2M}$, first to M−1th complex conjugation circuits $314_1$ to $314_{M-1}$, first to M−1th multipliers $315_1$ to $315_{M-1}$ and first and second adders $317_1$, $317_2$ have the same functions as those of the first to Mth antennas $211_1$ to $211_M$, the first to Mth reception RF units $212_1$ to $212_M$, the first to 2Mth analog-to-digital converters (A/D converters) $213_1$ to $213_{2M}$, the first to M−1th complex conjugation circuits $214_1$ to $214_{M-1}$, the first to M−1th multipliers $215_1$ to $215_{M-1}$ and the first and second adders $217_1$, $217_2$ shown in FIG. 3, they need not be described herein but the first and second symbol number accumulation units $318_1$, $318_2$ and the direction estimation circuit 316 will be described hereinafter.

The first symbol number accumulation unit $318_1$ is adapted to accumulate the real part added signal $M_R$ outputted from the first adder $317_1$ by the predetermined symbol number N. The second symbol number accumulation unit $318_2$ is adapted to accumulate the imaginary part added signal $M_I$ outputted from the second adder $317_2$ by the predetermined symbol number N. The direction estimation circuit 316 is adapted to estimate the direction θ of the desired signal based on the above-mentioned equations (5-1) and (5-2) by using the accumulated result $z_R$ of the real part added signal $M_R$ of the predetermined symbol number N and the accumulated result $z_I$ of the imaginary part added signal $M_I$ of the predetermined symbol number N outputted from the first and second symbol number accumulation units $318_1$, $318_2$.

(Fifth embodiment)

Figure 6:
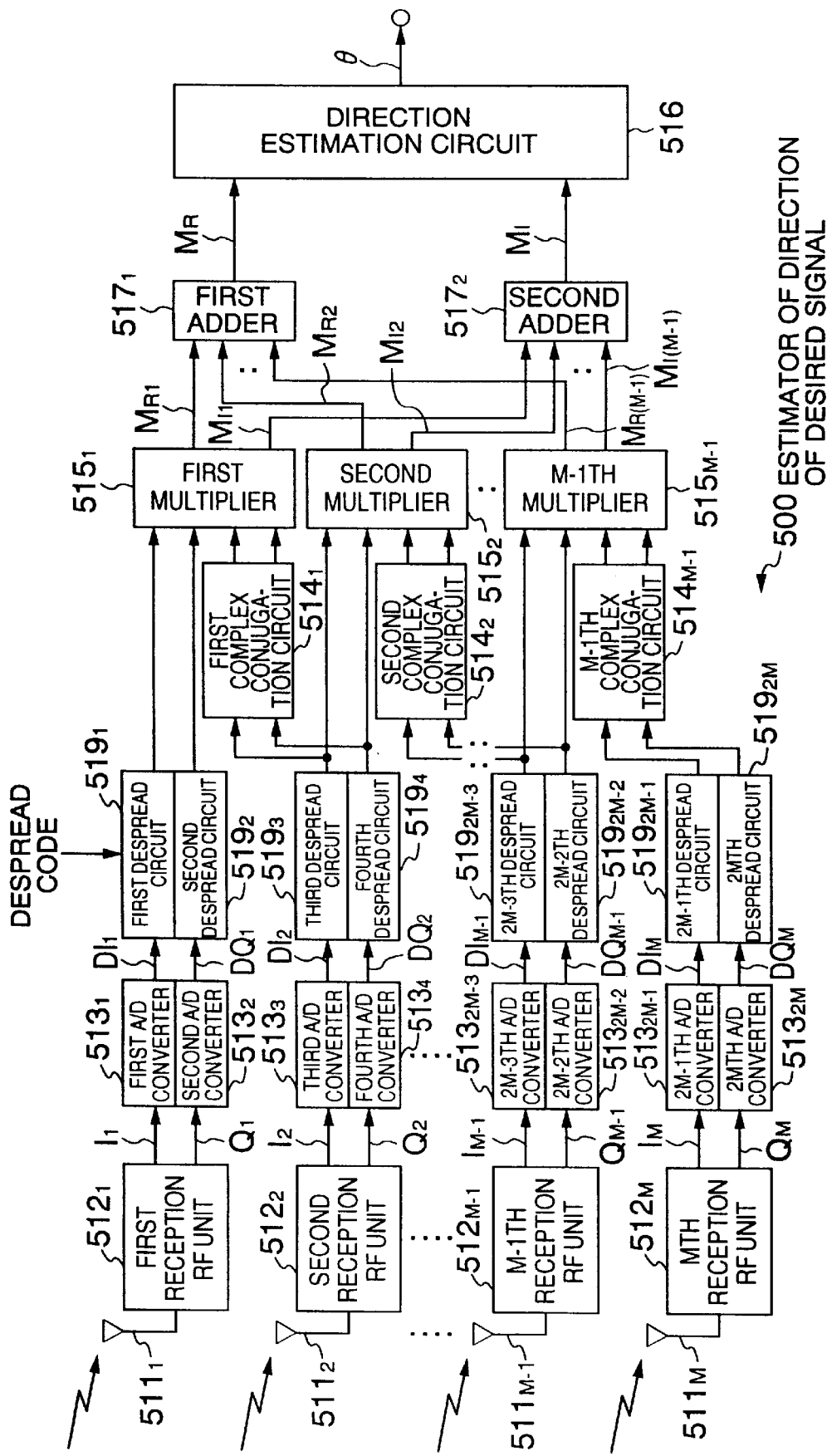
FIG. 6 is a block diagram showing an estimator of direction of desired signal according to a fifth embodiment of the present invention.

An estimator of direction of desired signal 500 according to the fifth embodiment of the present invention is used in a communication according to a CDMA (code division multiplex access) system. As shown in FIG. 6, this estimator 500 comprises first to Mth antennas $511_1$ to $511_M$, first to Mth reception RF units $512_1$ to $512_M$, first to 2Mth analog-to-digital converters (A/D converters) $513_1$ to $513_{2M}$, first to 2Mth despread circuits $519_1$ to $519_{2M}$, first to M−1th complex conjugation circuits $514_1$ to $514_{M-1}$, first to M−1th multipliers $515_1$ to $515_{M-1}$, first and second adders $517_1$, $517_2$ and a direction estimation circuit 516.

Having down-converted frequencies of high-frequency reception signals received the first to Mth antennas $511_1$ to $511_M$, the first to Mth reception RF units $512_1$ to $512_M$ orthogonal-detect the down-converted high-frequency reception signals, and convert the high-frequency reception signals into first to Mth inphase component signals $I_1$ to $I_M$ and first to Mth quadrature component signals $Q_1$ to $Q_M$ of the baseband band, respectively.

The first to 2Mth A/D converters $513_1$ to $513_{2M}$ are adapted to convert analog first to Mth inphase component signals $I_1$ to $I_M$ and analog first to Mth quadrature component signals $Q_1$ to $Q_M$ outputted from the first to Mth reception RF units $512_1$ to $512_M$ into first to Mth digital inphase component signals $DI_1$ to $DI_M$ and first to Mth digital quadrature component signals $DQ_1$ to $DQ_M$, respectively. For example, the first and second A/D converters $513_1$, $513_2$ are adapted to convert the analog first inphase component signal $I_1$ and the analog first quadrature component signal $Q_1$ outputted from the first reception RF unit $512_1$ into the first digital inphase component signal $DI_1$ and the first digital quadrature component signal $DQ_1$, respectively.

In the communication according to the CDMA system, since a transmission signal is spread by a predetermined spread code and then transmitted, the transmission signal is despread by using the same despread code as the spread code on the receiver side. The first to 2Mth despread circuits $519_1$ to $519_{2M}$ are adapted to despread the first to Mth digital inphase component signals $DI_1$ to $DI_M$ and the first to Mth digital quadrature component signals $DQ_1$ to $DQ_M$ outputted from the first to 2Mth A/D converters $513_1$ to $513_{2M}$, respectively. When a spread transmission signal is $s^0$ (generally, a spread signal is called "chip" and a signal which is not spread and a signal which is spread are called "symbol"), a reception signal $s_i$ received at an ith antenna of array antennas which are linearly located at an equal interval with a half wavelength interval is expressed by the following equation if $s^0$ represents a transmission symbol and θ represents an angle of a clockwise direction from the broadside direction.

$$s_i(kT_1) = s^0(kT_1) \cdot e^{j\pi i \cdot \cos\theta} \tag{6-1}$$

Incidentally, while the array antennas are located with the half wavelength interval as described above, so long as they are close to each other, they may be located with an interval of λ/n. In this case, the reception signal $s_i$ is expressed by the following equation:

$$s_i(kT_1) = s^0(kT_1) \cdot e^{j2\pi i/n \cdot \cos\theta} \tag{6-2}$$

If a spread code length is taken as P, a despread processing is carried out as in the following equation:

$$\begin{aligned} x_i(lT_2) &= \sum_{p=0}^{\tau-1} \alpha(p) s(lT_2 + pT_1) \\ &= \sum_{p=0}^{\tau-1} \alpha(p) s^0(lT_2 + pT_1) e^{j\pi i \cos\theta} \\ &= x^0(lT_2) e^{j\pi i \cos\theta} \end{aligned} \tag{6-3}$$

where α(p) (p=0 to P−1) represent despread codes (spread codes). Moreover, with respect to the chip s and the symbol x, the chip s is spread by P times as large as the symbol x, and hence $T_2 = P \times T_1$. In the above-mentioned equation (6-3), $x^0$ represents the transmission symbol.

As described above, even in the communication according to the CDMA system, the vector of the direction remains in the result of the despread processing. Therefore, it is possible to estimate the direction of the desired signal by using the vector of the direction.

The ith (i=1 to M−1) complex conjugation circuit $514_i$ is adapted to calculate a complex conjugation of a despread processing result of an i+1th digital inphase component signal $DI_{i+1}$ and a despread processing result of an i+1th digital quadrature component signal $DQ_{i+1}$ by inverting the code of the despread processing result of the i+1th digital quadrature component signal $DQ_{i+1}$ outputted from a 2(i+1)th despread circuit $519_{2(i+1)}$, and generates an ith complex conjugation signal. For example, the first complex conjugation circuit $514_1$ calculates a complex conjugation of a despread processing result of the second digital inphase component signal $DI_2$ and a despread processing result of the second digital quadrature component signal $DQ_2$ by inverting the code of the despread processing result of the second digital quadrature component signal $DQ_2$ outputted from the fourth despread circuit $519_4$, and generates the first complex conjugation signal.

The ith (i=1 to M−1) multiplier $515_i$ is adapted to multiply in vector the despread processing result of the ith digital inphase component signal $DI_i$ and the despread processing result of the ith digital quadrature component signal $DQ_i$ outputted from the ith and i+1th despread circuits $519_i$, $519_{i+1}$ and an ith complex conjugation signal outputted from the ith complex conjugation circuit $514_i$ (see the above-mentioned equation (2-1)). For example, the first multiplier $515_1$ is adapted to multiply in vector the despread processing result of the first digital inphase component signal $DI_1$ and the despread result of the first digital quadrature component signal $DQ_1$ outputted from the first and second inverse diffusion circuits $219_1$, $219_2$ and the first complex conjugation signal outputted from the first complex conjugation circuit $514_1$. Incidentally, the first to M−1th multipliers $515_1$ to $515_{M-1}$ are adapted to output first to M−1th real part signals $M_{R1}$ to $M_{R(M-1)}$ and first to M−1th imaginary part signals $M_{I1}$ to $M_{I(M-1)}$ of the multiplied results $M_1$ to $M_{M-1}$ in the first to M−1th multipliers $515_1$ to $515_{M-1}$, respectively. A vector multiplication result of the ith multiplier $515_i$ is expressed by the following equation:

$$\begin{aligned} y_i(n) &= x_{i+1}(n) \times x_i^*(n) \quad (6\text{-}4) \\ &= \{x^0(n) e^{j\pi i (i+1) \cos\theta}\} \{(x^0(n))^* e^{-j\pi i \cdot \cos\theta}\} \\ &= x^0(n) \times (x^0(n))^* e^{j\pi \cos\theta} \end{aligned}$$

where $x^0(n) \times (x^0(n))^*$ represents the power of the transmission symbol. Since the equation (6-4) has no term of the antenna number i, multiplied results can be added at every combination of antenna.

The first adder $517_1$ adds the first to M−1th real part signals $M_{R1}$ to $M_{R(M-1)}$ outputted from the first to M−1th multipliers $515_1$ to $515_{M-1}$, and then outputs the real part added signal $M_R$. The second adder $517_2$ adds the first to M−1th imaginary part signals $M_{I1}$ to $M_{I(M-1)}$ outputted from the first to M−1th multipliers $515_1$ to $515_{M-1}$, and then outputs the imaginary part added signal $M_I$. An added value z of powers and a direction θ of the desired signal obtained where M assumes the number of antennas and N assumes the number of symbols are respectively expressed by the following equations:

$$z = \sum_{i=0}^{M-2} y_1(n) \quad (6\text{-}5)$$

$$\theta = \cos^{-1}\left(\frac{1}{\pi} \tan^{-1}\left(\frac{Im(z)}{Re(z)}\right)\right) \quad (6\text{-}6)$$

In the above-mentioned equation (6-6), Re(·) represents the calculation of producing a real part, and its calculated result corresponds to the real part added signal $M_R$. Moreover, Im(·) represents the calculation of producing the imaginary part, and its calculated result corresponds to the imaginary part added signal $M_I$. The direction estimation circuit 516 carries out the inverse tangent calculation and the inverse cosine calculation by using the real part added signal $M_R$ outputted from the first adder $517_1$ and the imaginary part added signal $M_I$ outputted from the second adder $517_2$, and estimates the direction θ of the desired signal based on the above-mentioned equation (6-6).

As described above, even in the communication according to the CDMA system, the direction vector of the desired signal is calculated by effecting the complex conjugation calculation and the multiplication calculation on the despread symbol, that is, by effecting a similar calculation to the delayed detection calculation between the outputs of the adjacent antennas. Furthermore, by carrying out the addition of the combination of antennas in the adding circuit, it is possible to estimate the direction of the desired signal with the inverse tangent calculation and the inverse cosine calculation while the SN ratio also can be improved.

As described above, in the estimator according to this embodiment, since the calculation can be carried out not at the chip speed but at the symbol speed in the communication according to the CDMA system, it is possible to reduce the calculation speed to a 1/spread rate. Further, since the despread processing is carried out by using the same despread code as the spread code, with respect to an interference wave (interference signal) of the same direction as that of the desired wave, it is possible to reduce the electric power of the interference wave to a 1/process gain. As a consequence, it is possible to estimate the direction of the desired signal independently of the direction of the interference wave.

(Sixth embodiment)

Figure 8:
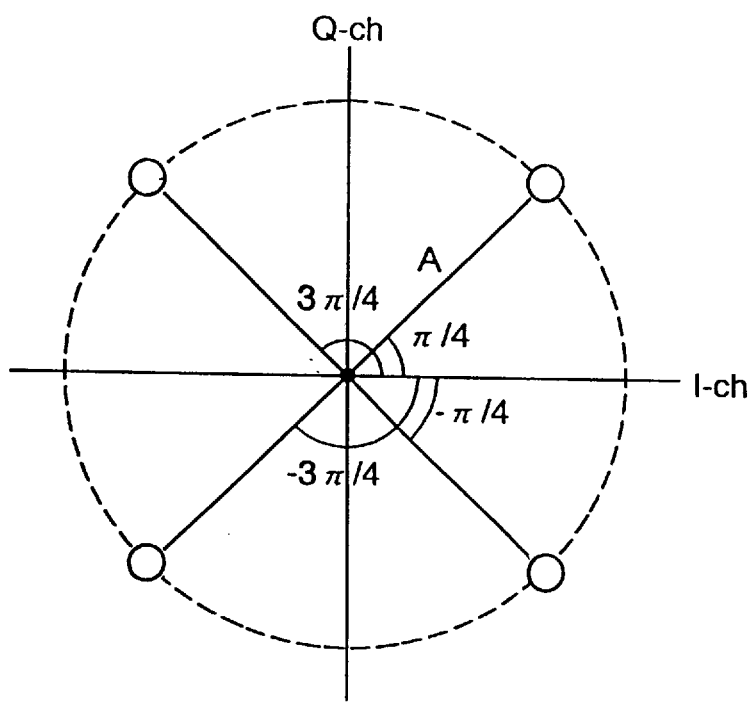
FIG. 8 is a diagram showing a signal format according to a modulation system in the estimator of direction of desired signal shown in FIG. 7.

In a QPSK (quadrature phase shift keying) modulation system in which signal points are located as shown in FIG. 8, if an amplitude is taken as A and a phase is taken as $\Phi(n) = \{\pm\pi/4, \pm3\pi/4\}$, then a transmission symbol is expressed by the following equation:

$$s(n) = A \cdot e^{j\Phi(n)} \quad (7\text{-}1)$$

If an angle of the clockwise direction from the broad-side direction is taken as θ, then a reception signal of the ith antenna of the array antennas linearly located at an equal interval with a half wavelength interval is expressed by the following equation:

$$x_i(n) = s(n) \cdot e^{j\pi i \cdot \cos\theta} = A \cdot e^{j\Phi(n)} \cdot e^{j\pi i \cdot \cos\theta} \quad (7\text{-}2)$$

Incidentally, while the array antennas are located with the half wavelength interval as described above, so long as they are close to each other, they may be located with an interval of λ/n. In this case, the second phase term of the above-mentioned equation (7-2) is expressed by $e^{j2\pi i/n \cdot \cos\theta}$.

If the complex conjugation signal of the output signal of one antenna and the output signal of the other antenna are multiplied between the adjacent antennas, then as shown by the following equation, a multiplied result $y_i(n)$ does not become a function of the antenna number i and phase Φ of transmission symbol:

$$\begin{aligned} y_i(n) &= x_{i+1}(n) \times x_i^*(n) \quad (7\text{-}3) \\ &= \{A \cdot e^{j\phi(n)} \cdot e^{j\pi (i+1)\cdot\cos\theta}\} \cdot \{A \cdot e^{-j\phi(n)} \cdot e^{-j\pi i\cdot\cos\theta}\} \\ &= A^2 \cdot e^{j\pi\cos\theta} \end{aligned}$$

Therefore, the multiplied results which are obtained by the above-mentioned equation (7-3) between the adjacent antennas may be added in case the modulation system in which the power of the transmission symbol becomes constant is used. Accordingly, if the direction of the desired signal is estimated by adding the multiplied results obtained by the above-mentioned equation (7-3) at every antenna and over all symbols, then it is possible to improve an SN ratio.

Figure 7:
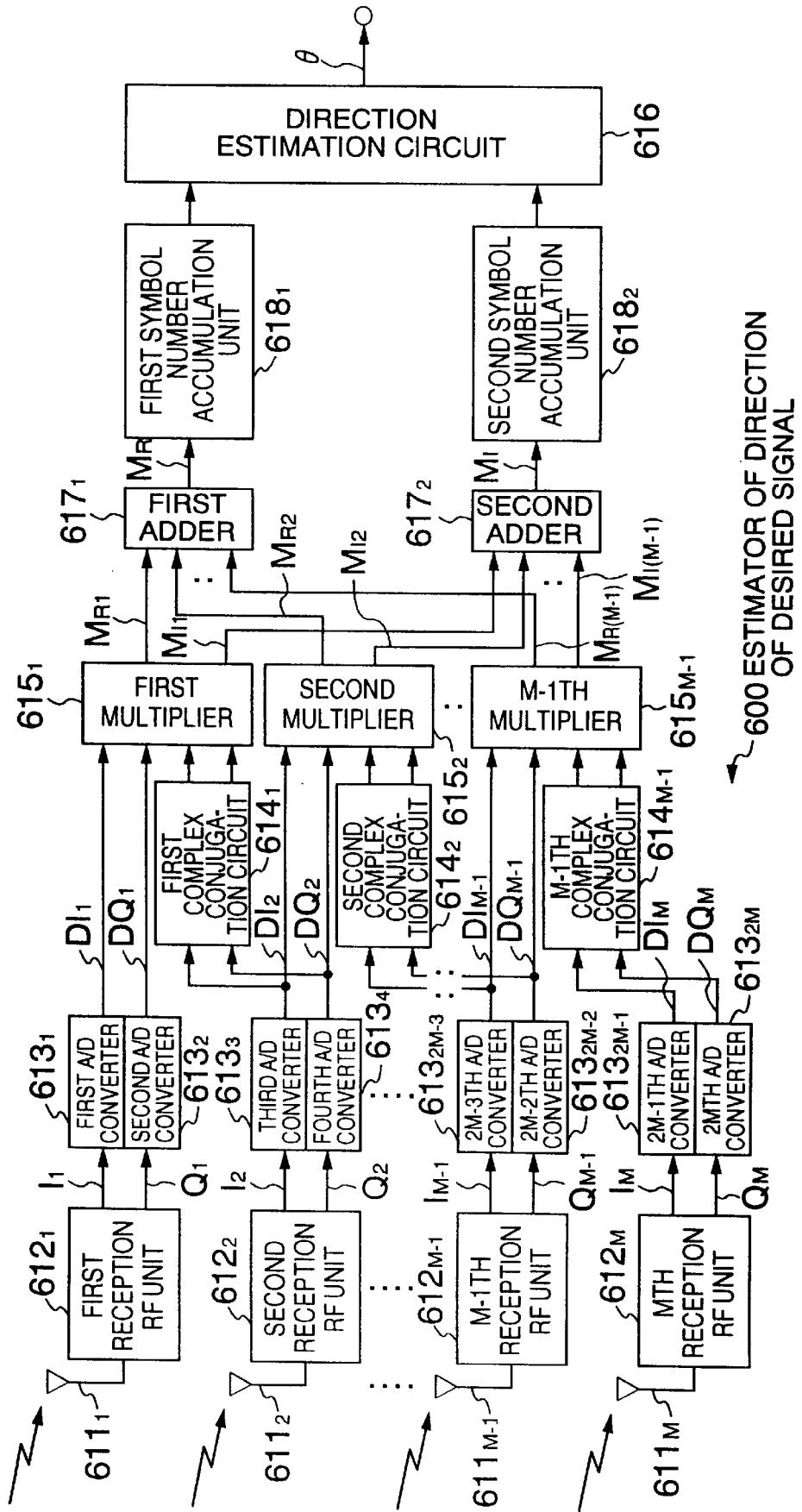
FIG. 7 is a block diagram showing an estimator of direction of desired signal according to a sixth embodiment of the present invention.

An estimator of direction of desired signal 600 according to the sixth embodiment of the present invention is the above-mentioned estimator. As shown in FIG. 7, this estimator 600 includes first to Mth antennas $611_1$ to $611_M$, first to Mth reception RF units $612_1$ to, $612_M$, first to 2Mth analog-to-digital converters (A/D converters) $613_1$ to $613_{2M}$, first to M−1th complex conjugation circuits $614_1$ to $614_{M-1}$, first to M−1th multipliers $615_1$ to $615_{M-1}$, first and second adders $617_1$, $617_2$, first and second symbol number accumulation units $618_1$, $618_2$ and a direction estimation circuit 616.

An operation of the estimator 600 according to this embodiment is similar to that of the estimator 300 according to the fourth embodiment shown in FIG. 5 but differs from that of the estimator 300 according to the fourth embodiment in the following points:

(1) The first symbol number accumulation unit $618_1$ accumulates the real part added signal $M_R$ outputted from the first adder $617_1$ by the number of symbols obtained during the interval of the known symbol series P and the interval of the data series D. Moreover, the second symbol number accumulation unit $618_2$ accumulates the imaginary part added signal $M_I$ outputted from the second adder $617_2$ by the number of symbols obtained during the interval of the known symbol series P and the interval of the data series D.

(2) The direction estimation circuit 616 estimates the direction θ of the desired signal based on the above-mentioned equations (7-1) to (7-3) by using the accumulated result of the real part added signal $M_R$ and the accumulated result of the imaginary part added signal $M_I$ outputted from the first and second symbol number accumulation units $618_1$, $618_2$.

Incidentally, while the QPSK modulation system is used as the modulation system as described above, the present invention is not limited thereto and the modulation system may be modulation systems other than the QPSK modulation system so long as the envelope of the transmission symbol becomes constant.

(Seventh embodiment)

In the QPSK modulation system in which the signal points are located as shown in FIG. 8, the transmission symbol is expressed by the following equation where A assumes an amplitude and $\Phi(n)=\{\pm\pi/4, \pm 3\pi/4\}$ assumes a phase:

$$s(n) = A \cdot e^{j\Phi(n)} \qquad (8\text{-}1)$$

If the initial phase of every start portion of slot is taken as γ and the clockwise direction angle from the broad-side direction is taken as θ, a reception signal received at the ith antenna of the array antennas linearly located at an equal interval with a half wavelength interval is expressed by the following equation:

$$x_i(n) = s(n) \cdot e^{j\pi i \cdot \cos\theta} \cdot e^{j\gamma} = A \cdot e^{j\Phi(n)} \cdot e^{j\pi i \cdot \cos\theta} \cdot e^{j\gamma} \qquad (8\text{-}2)$$

Incidentally, while the array antennas are located with the half wavelength interval as described above, so long as the array antennas are close to each other, they may be located with an interval of λ/n. In this case, the second phase term of the above-mentioned equation (8-2) is expressed by $e^{j2\pi i/n \cdot \cos\theta}$.

If the complex conjugation signal of the output signal of one antenna and the output signal of the other antenna are multiplied between the adjacent antennas, then as shown by the following equations, the multiplied result $y_i(n)$ does not become a function of the antenna number i, the phase Φ of the transmission symbol and the initial phase γ of every start portion of slot no longer.

$$\begin{aligned} y_i(n) &= x_{i+1}(n) \times x_i^*(n) \qquad (8\text{-}3) \\ &= \{A \cdot e^{j\phi(n)} \cdot e^{j\pi(i+1)\cdot\cos\theta} \cdot e^{j\gamma}\} \cdot \\ & \quad \{A \cdot e^{-j\phi(n)} \cdot e^{-j\pi i\cdot\cos\theta}\} \cdot e^{-j\gamma}\} \\ &= A^2 \cdot e^{j\pi\cdot\cos\theta} \end{aligned}$$

Accordingly, multiplied results obtained by the above-mentioned equation (8-3) between the adjacent antennas may be added when the modulation system in which the power of the transmission symbol becomes constant is used. Therefore, if the direction of the desired signal is estimated by adding the multiplied results obtained in the above-mentioned equation (8-3) at every antenna and over all symbols, then it is possible to improve the SN ratio. Furthermore, if an average value of slots is calculated during a duration of time which can follow the change of direction of desired signal, then it is possible to improve the SN ratio much more.

Figure 9:
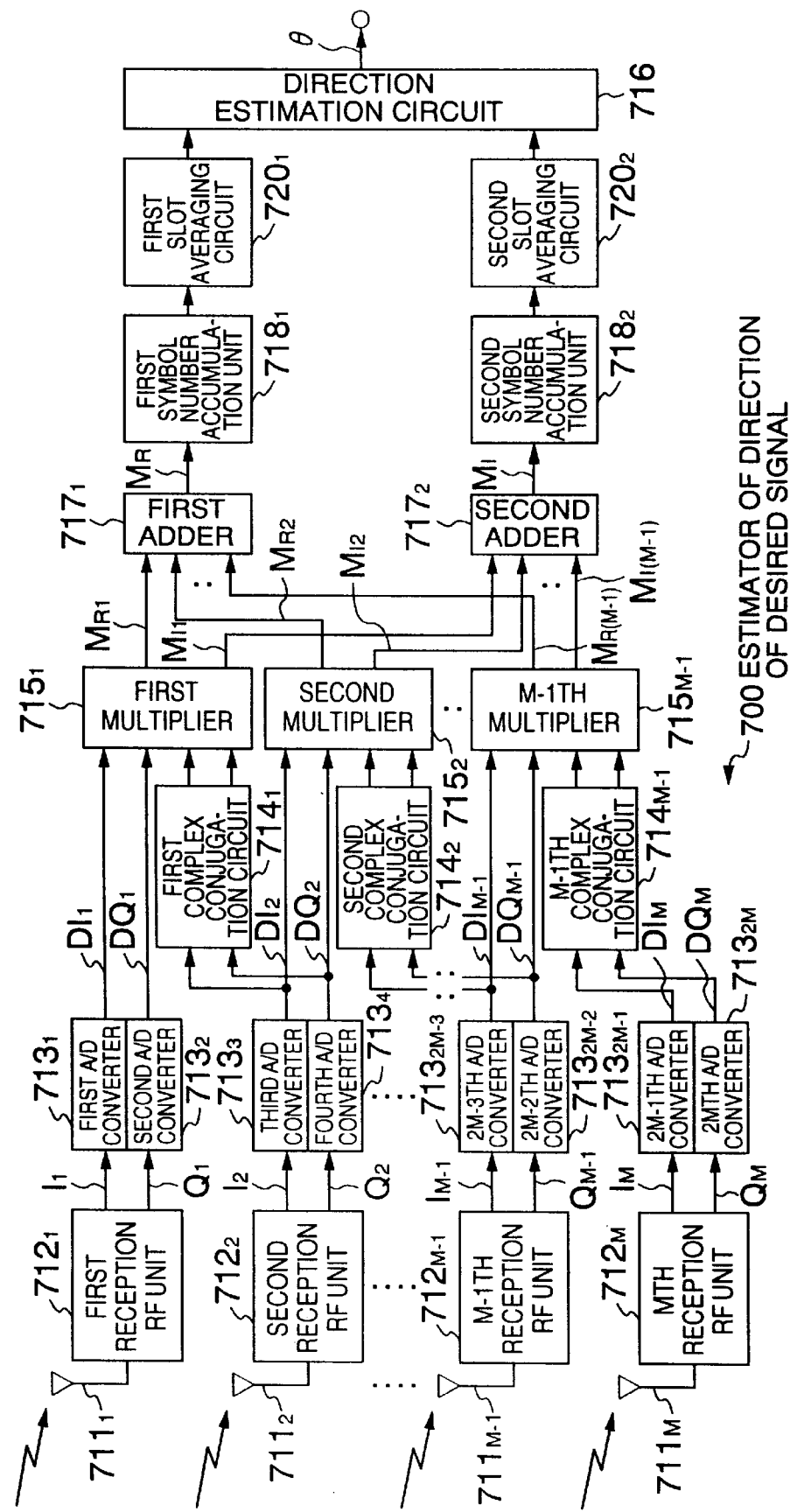
FIG. 9 is a block diagram showing an estimator of direction of desired signal according to a seventh embodiment of the present invention.

The estimator 700 according to the seventh embodiment of the present invention is the above-mentioned estimator. As shown in FIG. 9, the estimator 700 differs from the estimator 600 according to the sixth embodiment shown in FIG. 7 in that a first slot averaging circuit $720_1$ is disposed between the first symbol number accumulation unit $718_1$ and the direction estimation circuit 716 and a second slot averaging circuit $720_2$ is disposed between the second symbol number accumulation circuit $718_2$ and the direction estimation circuit 716. Therefore, since the first to Mth antennas $711_1$ to $711_M$, the first to Mth reception RF units $712_1$ to $712_M$, the first to 2Mth analog-to-digital converters (A/D converters) $713_1$ to $713_{2M}$, the first to M−1th complex conjugation circuits $714_1$ to $714_{M-1}$, the first to M−1th multipliers $715_1$ to $715_{M-1}$, the first and second adders $717_1$, $717_2$, and the first and second symbol number accumulation units $718_1$, $718_2$ have the same functions as those of the first to Mth antennas $611_1$ to $611_M$, the first to Mth reception RF units $612_1$ to $612_M$, the first to 2Mth analog-to-digital converters (A/D converters) $613_1$ to $613_{2M}$, the first to M−1th complex conjugation circuits $614_1$ to $614_{M-1}$, the first to M−1th multipliers $615_1$ to $615_{M-1}$, the first and second adders $617_1$, $617_2$ and the first and second symbol number accumulation units $618_1$, $618_2$, they need not be described herein, and the first and second slot averaging circuits $720_1$, $720_2$ and the direction estimation circuit 716 will be described hereinafter.

The first slot averaging circuit $720_1$ averages the accumulated result of the real number added signal $M_R$ outputted from the first symbol number accumulation unit $718_1$. The second slot averaging circuit $720_2$ averages the accumulated result of the imaginary part added signal $M_I$ outputted from the second symbol number accumulation unit $718_2$. An average length in the averaging processing in the first and second slot averaging circuits $720_1$, $720_2$ should preferably be lower than a speed at which a direction of a desired signal is changed. Also, as a concrete method of the averaging processing, there are methods using a moving averaging and an oblivion coefficient, etc.

The direction estimation circuit 716 is adapted to estimate the direction θ of the desired signal based on the above-mentioned equations (8-1) to (8-3) by using the output signals from the first and second slot averaging circuits $720_1$, $720_2$.

While the QPSK modulation system is used as the modulation system as described above, the present invention is not limited thereto and the modulation system may be other modulation systems than the QPSK modulation system so long as the envelope of the transmission symbol becomes constant.

(Eighth embodiment)

An estimator of direction of desired signal 700 according to the seventh embodiment could improve the SN ratio by updating the direction vector (corresponding to z in the above-mentioned equation (6-5)) over a plurality of slots.

However, in a wireless communication, the level of reception signal is fluctuated depending upon a propagation distance and a fading. Also, a noise is added to the level of the reception signal at the reception RF unit of the receiver. When a noise is larger than a reception signal, the direction vector of the desired signal is not directed in the same direction so that, if the direction vector is added by the amount of one slot, then the added direction vector becomes smaller than that obtained in the case of a small noise.

Therefore, the estimator 800 according to the eighth embodiment of the present invention calculates a power of a direction vector (corresponding to z in the above-mentioned equation (6-5)) of one slot period, compares the calculated power with a predetermined threshold value, and improves an SN ratio by updating the direction vector when the calculated power is larger than the predetermined threshold value.

Figure 10:
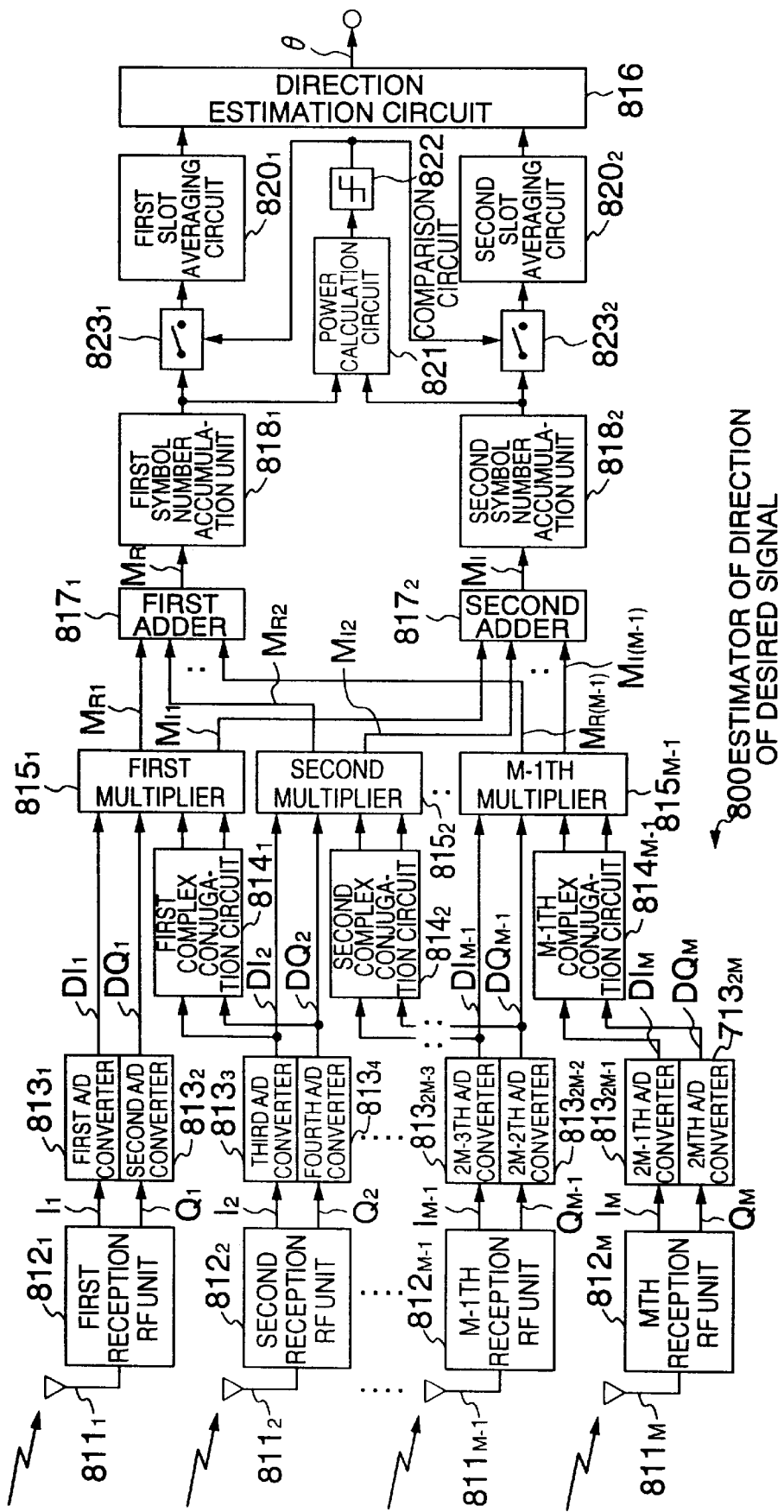
FIG. 10 is a block diagram showing an estimator of direction of desired signal according to an eighth embodiment of the present invention.

As shown in FIG. 10, the estimator 800 according to this embodiment differs from the estimator 700 according to the seventh embodiment shown in FIG. 9 in that it includes a power calculating circuit 821 to which output signals from first and second symbol number accumulation units $818_1$, $818_2$ are inputted, a comparator 822 to which an output signal from the power calculating circuit 821 is inputted, a first switch $823_1$ disposed between the first symbol number accumulation unit $818_1$ and a first slot averaging circuit $820_1$ and which is opened and closed in response to an output signal from the comparator 822 and a second switch $823_2$ disposed between the second symbol number accumulation unit $818_2$ and a second slot averaging circuit $820_2$ and which is opened and closed in response to the output signal from the comparator 822. Accordingly, since first to Mth antennas $811_1$ to $811_M$, first to Mth reception RF units $812_1$ to $812_M$, first to 2Mth analog-to-digital converters (A/D converters) $813_1$ to $813_{2M}$, first to M−1th complex conjugation circuits $814_1$, to $814_{M-1}$, first to M−1th multipliers $815_1$ to $815_{M-1}$, first and second adders $817_1$, $817_2$, the first and second symbol number accumulation units $818_1$, $818_2$, the first and second slot averaging circuit $820_1$, $820_2$ and the direction estimation circuit 816 have the same functions as those of the first to Mth antennas $711_1$ to $711_M$, the first to Mth reception RF units $712_1$ to $712_M$, the first to 2Mth analog-to-digital converters (A/D converters) $713_1$ to $713_{2M}$, the first to M−1th complex conjugation circuits $714_1$ to $714_{M-1}$, the first to M−1th multipliers $715_1$ to $715_{M-1}$, the first and second adders $717_1$, $717_2$, the first and second symbol number accumulation units $718_1$, $718_2$, the first and second slot averaging circuits $720_1$, $720_2$ and the direction estimation circuit 716, they need not be described herein. The power calculating circuit 821, the comparator 822 and the first and second switches $823_1$, $823_2$ will be described below.

The power calculating circuit 821 is adapted to calculate a power of a direction vector of one slot period by using the output signals from the first and second symbol number accumulation units $818_1$, $818_2$. The comparator 822 compares the power of the direction vector of one slot period calculated by the power calculating circuit 821 with a predetermined threshold value, and closes the first and second switches $823_1$, $823_2$ when the power of the direction vector of one slot period is larger than the predetermined threshold value. Therefore, when the power of the direction vector of one slot period is smaller than the threshold value, the output signals from the first and second symbol number accumulation units $818_1$, $818_2$ are not inputted to the first and second slot averaging circuits $720_1$, $720_2$ with the result that the direction vector is not updated.

(Embodiment of transmission and reception apparatus)

A transmission and reception apparatus 400 which includes an estimation section of direction of desired signal 900 having a configuration similar to that of the estimator 300 according to the fourth embodiment shown in FIG. 5 and a transmission section 1000 for controlling a transmission direction of a transmission signal by using the direction θ of the desired signal estimated by the estimation section 900 will next be described with reference to FIG. 11.

As shown in FIG. 11, the estimation unit 900 of the transmission and reception apparatus 400 includes first to Mth antennas $911_1$ to $911_M$, first to Mth reception RF units $912_1$ to $912_M$, first to 2Mth analog-to-digital converters (A/D converters) $913_1$ to $913_{2M}$, first to M−1th complex conjugation circuits $914_1$ to $914_{M-1}$, first to M−1th multipliers $915_1$ to $915_{M-1}$, first and second adders $917_1$, $917_2$, first and second symbol number accumulation units $918_1$, $918_2$ and a direction estimation circuit 916. The transmission unit 1000 of the transmission and reception apparatus 400 includes a transmission directivity control circuit 1010, a mapping circuit 1011, first and second digital-to-analog converters (D/A converters) $1012_1$, $1012_2$, a transmission RF unit 1013, first to Mth phase shifters $1014_1$ to $1014_M$ and first to Mth transmission antennas $1015_1$ to $1015_M$ which configure array antennas. An operation of the estimation section 900 is similar to that of the above-mentioned estimator 300 according to the fourth embodiment, and therefore need not be described. But instead, an operation of the transmission section 1000 will be described hereinafter.

A transmission signal T is mapped by the mapping circuit 1011 and thereby converted into an inphase component signal $T_I$ and a quadrature component signal $T_Q$. The inphase component signal $T_I$ and the quadrature component signal $T_Q$ are converted by the first and second D/A converters $1012_1$, $1012_2$ into an analog inphase component signal $AT_I$ and an analog quadrature component signal $AT_Q$, respectively. The analog inphase component signal $AT_I$ and the analog quadrature component signal $AT_Q$ are converted by the transmission RF unit 1013 into a high-frequency transmission signal AT. The transmission directivity control circuit 1010 calculates the control signals of the first to Mth phase shifters $1014_1$ to $1014_M$ by using the direction θ of the desired signal estimated by the direction estimation circuit 916, and the calculated control signals are outputted to the first to Mth phase shifters $1014_1$ to $1014_M$. The high-frequency transmission signal AT is phase-controlled by the first to Mth phase shifters $1014_1$ to $1014_M$ and then transmitted from the first to Mth transmission antennas $1015_1$ to $1015_M$, thereby controlling the radio waves transmitted from the first to Mth transmission antennas $1015_1$ to $1015_M$ in such a manner that the phases of the radio waves are directed to the direction θ of the desired signal.

Incidentally, while the transmission and reception apparatus 400 according to this embodiment uses the estimation unit 900 having the configuration similar to that of the estimator 300 according to the fourth embodiment shown in FIG. 5 as described above, the present invention is not limited thereto, and the transmission and reception apparatus 400 may use an estimation unit having a configuration similar to that of the estimator 10 according to the first embodiment shown in FIG. 2, the estimator 200 according to the second embodiment shown in FIG. 3, the estimator 100 according to the third embodiment shown in FIG. 4, the estimator 500 according to the fifth embodiment shown in FIG. 6, the estimator 600 according to the sixth embodiment shown in FIG. 7, the estimator 700 according to the seventh embodiment shown in FIG. 9 or the estimator 800 according to the eighth embodiment shown in FIG. 10.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. An estimator of direction of desired signal for estimating a direction of a desired signal comprising:

first and second antennas for receiving said desired signal;

first and second signal conversion circuits for orthogonal-detecting output signals of said first and second antennas and converting the detected output signals into first and second baseband signals, respectively;

a complex conjugation circuit for generating a complex conjugation signal by calculating a complex conjugation of said second baseband signal;

a multiplier for multiplying said first baseband signal and said complex conjugation signal; and a direction estimation circuit for estimation the direction of said desired signal by effecting an inverse tangent calculation and an inverse cosine calculation on an output signal of said multiplier.

2. A transmission and reception apparatus for controlling a transmission direction of a transmission signal by using a direction of a desired signal, comprising:

an estimator of direction of desired signal of claim 1 a phase shifter for phase-controlling said transmission signal;

a transmission directivity control circuit for controlling said phase shifter based on the direction of said desired signal estimated by said estimator and determining a phase of said transmission signal; and a transmission antenna to which an output signal of said phase shifter is inputted.

3. An estimator of direction of desired signal for estimating a direction of a desired signal comprising:

first to third antennas for receiving said desired signal;

first to third signal conversion circuits for orthogonal-detecting output signals of said first to third antennas and converting the detected output signals into first to third baseband signals, respectively;

first and second complex conjugation circuits for generating first and second complex conjugation signals by calculating complex conjugations of said second and third baseband signal;

a first multiplier for multiplying said first baseband signal and said first complex conjugation signal;

a second multiplier for multiplying said second baseband signal and said second complex conjugation signal;

adders for adding an output signal of said first multiplier and an output signal of said second multiplier; and a direction estimation circuit for estimating the direction of said desired signal by effecting an inverse tangent calculation and an inverse cosine calculation on output signals of said adders.

4. A transmission and reception apparatus for controlling a transmission direction of a transmission signal by using a direction of a desired signal, comprising:

an estimator of direction of desired signal of claim 3;

a phase shifter for phase-controlling said transmission signal;

a transmission directivity control circuit for controlling said phase shifter based on the direction of said desired signal estimated by said estimator and determining a phase of said transmission signal; and a transmission antenna to which an output signal of said phase shifter is inputted.

5. An estimator of direction of desired signal for estimating a direction of a desired signal containing a plurality of known symbols each having an equal power comprising:

first and second antennas for receiving said desired signal;

first and second signal conversion circuits for orthogonal-detecting output signals of said first and second antennas and converting the detected output signals into first and second baseband signals, respectively;

a complex conjugation circuit for generating a complex conjugation signal by calculating a complex conjugation of said second baseband signal corresponding to said known symbols;

a multiplier for multiplying said first baseband signal corresponding to said known symbols and said complex conjugation signal;

a symbol number accumulation unit for accumulating an output signal of said multiplier with respect to at least more than two known symbols; and a direction estimation circuit for estimating the direction of said desired signal by effecting an inverse tangent calculation and an inverse cosine calculation on an output signal of said symbol number accumulation unit.

6. A transmission and reception apparatus for controlling a transmission direction of a transmission signal by using a direction of a desired signal, comprising:

an estimator of direction of desired signal of claim 5;

a phase shifter for phase-controlling said transmission signal;

a transmission directivity control circuit for controlling said phase shifter based on the direction of said desired signal estimated by said estimator and determining a phase of said transmission signal; and a transmission antenna to which an output signal of said phase shifter is inputted.

7. An estimator of direction of desired signal for estimating a direction of a desired signal containing a plurality of known symbols each having an equal power comprising:

first to third antennas for receiving said desired signal;

first to third signal conversion circuits for orthogonal-detecting output signals of said first to third antennas and converting the detected output signals into first to third baseband signals, respectively;

first and second complex conjugation circuits for generating first and second complex conjugation signals by calculating complex conjugations of said second and third baseband signals corresponding to said known symbols, respectively;

a first multiplier for multiplying said first baseband signal corresponding to said known symbols and said first complex conjugation signal;

a second multiplier for multiplying said second baseband signal corresponding to said known symbols and said second complex conjugation signal;

an adder for adding an output signal of said first multiplier and an output signal of said second multiplier;

a symbol number accumulation unit for accumulating an output signal of said adder with respect to at least more than two known symbols; and a direction estimation circuit for estimating the direction of said desired signal by effecting an inverse tangent calculation and an inverse cosine calculation on an output signal of said symbol number accumulation unit.

8. A transmission and reception apparatus for controlling a transmission direction of a transmission signal by using a direction of a desired signal, comprising:

an estimator of direction of desired signal of claim 7;

a phase shifter for phase-controlling said transmission signal;

a transmission directivity control circuit for controlling said phase shifter based on the direction of said desired signal estimated by said estimator and determining a phase of said transmission signal; and a transmission antenna to which an output signal of said phase shifter is inputted.

9. An estimator of direction of desired signal for estimating a direction of a desired signal used in a communication according to a code division multiplex access system comprising:

first to third antennas for receiving said desired signal;

first to third signal converting circuits for orthogonal-detecting output signals from said first to third antennas and converting the detected output signals into first to third baseband signals, respectively;

first to third despread circuits for despreading said first to third baseband signals, respectively;

first and second complex conjugation circuits for generating first and second complex conjugation signals by calculating complex conjugations of said despread second and third baseband signals, respectively;

a first multiplier for multiplying said despread first baseband signal and said first complex conjugation signal;

a second multiplier for multiplying said despread second baseband signal and said second complex conjugation signal;

an adder for adding an output signal of said first multiplier and an output signal of said second multiplier; and a direction estimation circuit for estimating the direction of said desired signal by effecting an inverse tangent calculation and an inverse cosine calculation on an output signal of said adder.

10. A transmission and reception apparatus for controlling a transmission direction of a transmission signal by using a direction of a desired signal, comprising:

an estimator of direction of desired signal of claim 9;

a phase shifter for phase-controlling said transmission signal;

a transmission directivity control circuit for controlling said phase shifter based on the direction of said desired signal estimated by said estimator and determining a phase of said transmission signal; and a transmission antenna to which an output signal of said phase shifter is inputted.

11. An estimator of direction of desired signal for estimating a direction of a desired signal used in a communication according to a modulation system in which an envelope of a transmission symbol becomes constant, said desired signal containing a plurality of known symbols and a plurality of data, comprising:

first to third antennas for receiving said desired signal;

first to third signal conversion circuits for orthogonal-detecting output signals of said first to third antennas and converting the detected output signals into first to third baseband signals, respectively;

first and second complex conjugation circuits for generating first and second complex conjugation signals by calculating complex conjugations of said second and third baseband signals corresponding to said known symbols and said data, respectively;

a first multiplier for multiplying said first baseband signal corresponding to said known symbols and said data and said first complex conjugation signal;

a second multiplier for multiplying said second baseband signal corresponding to said known symbols and said data and said second complex conjugation signal;

an adder for adding an output signal of said first multiplier and an output signal of said second multiplier;

a symbol number accumulation unit for accumulating an output signal of said adder with respect to at least more than two said known symbols and at least more than two said data; and a direction estimation circuit for estimating the direction of said desired signal by effecting an inverse tangent calculation and an inverse cosine calculation on an output signal of said symbol number accumulation unit.

12. A transmission and reception apparatus for controlling a transmission direction of a transmission signal by using a direction of a desired signal, comprising:

an estimator of direction of desired signal of claim 11;

a phase shifter for phase-controlling said transmission signal;

a transmission directivity control circuit for controlling said phase shifter based on the direction of said desired signal estimated by said estimator and determining a phase of said transmission signal; and a transmission antenna to which an output signal of said phase shifter is inputted.

13. An estimator of direction of desired signal for estimating a direction of a desired signal used in a communication according to a modulation system in which an envelope of a transmission symbol becomes constant, said desired signal containing a plurality of known symbols and a plurality of data, comprising:

first to third antennas for receiving said desired signal;

first to third signal conversion circuits for orthogonal-detecting output signals of said first to third antennas and converting the detected output signals into first to third baseband signals, respectively;

first and second complex conjugation circuits for generating first and second complex conjugation signals by calculating complex conjugations of said second and third baseband signals corresponding to said known symbols and said data, respectively;

a first multiplier for multiplying said first baseband signal corresponding to said known symbols and said data and said first complex conjugation signal;

a second multiplier for multiplying said second baseband signal corresponding to said known symbols and said data and said second complex conjugation signal;

an adder for adding an output signal of said first multiplier and an output signal of said second multiplier;

a symbol number accumulation unit for accumulating an output signal of said adder with respect to at least more than two said known symbols and at least more than two said data;

a slot averaging circuit for averaging an output signal of said symbol number accumulation unit during a period of at least more than two slots; and a direction estimation circuit for estimating the direction of said desired signal by effecting an inverse tangent calculation and an inverse cosine calculation on an output signal of said slot averaging circuit.

14. A transmission and reception apparatus for controlling a transmission direction of a transmission signal by using a direction of a desired signal, comprising:

an estimator of direction of desired signal of claim 13;

a phase shifter for phase-controlling said transmission signal;

a transmission directivity control circuit for controlling said phase shifter based on the direction of said desired signal estimated by said estimator and determining a phase of said transmission signal; and a transmission antenna to which an output signal of said phase shifter is inputted.

15. An estimator of direction of desired signal according to claim 13, further comprising:

a power calculation circuit for calculating a power of a direction vector of one slot from the output signal of said symbol number accumulation unit; and a comparison circuit for comparing an output signal of said power calculation circuit and a predetermined threshold value and inputting the output signal of said symbol number accumulation unit into said slot averaging circuit when the output signal of said power calculation circuit is larger than said predetermined threshold value.

16. A transmission and reception apparatus for controlling a transmission direction of a transmission signal by using a direction of a desired signal, comprising:

an estimator of direction of desired signal of claim 15;

a phase shifter for phase-controlling said transmission signal;

a transmission directivity control circuit for controlling said phase shifter based on the direction of said desired signal estimated by said estimator and determining a phase of said transmission signal; and a transmission antenna to which an output signal of said phase shifter is inputted.

\* \* \* \* \*